May 24, 1932.  H. D. STEVENS ET AL  1,859,849
MOLD HANDLING DEVICE
Filed Aug. 15, 1927   2 Sheets-Sheet 1
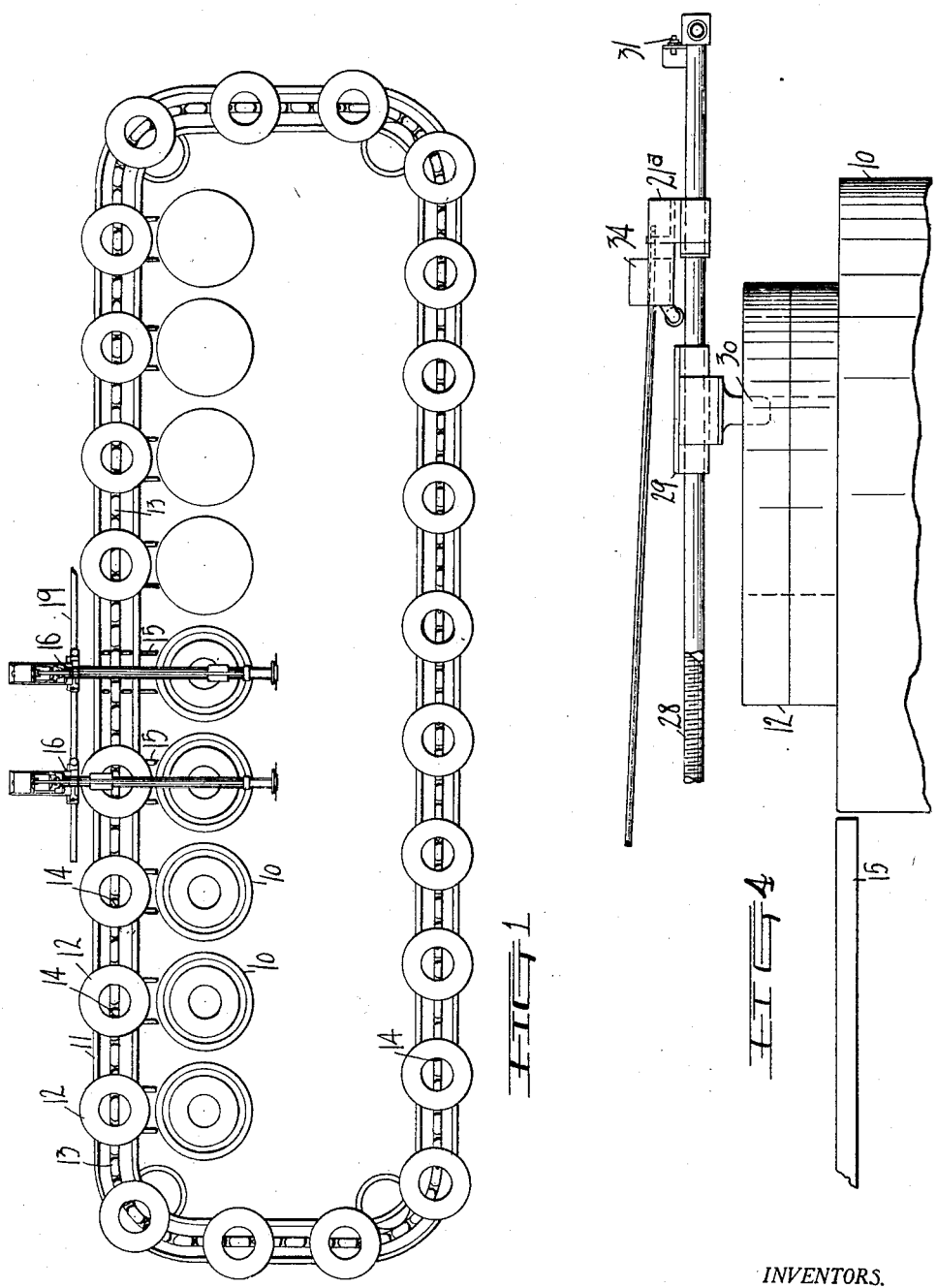
INVENTORS.
HORACE D. STEVENS
NELSON H. MYERS
BY Ely & Barrow
ATTORNEYS.

May 24, 1932. H. D. STEVENS ET AL 1,859,849
MOLD HANDLING DEVICE
Filed Aug. 15, 1927 2 Sheets-Sheet 2
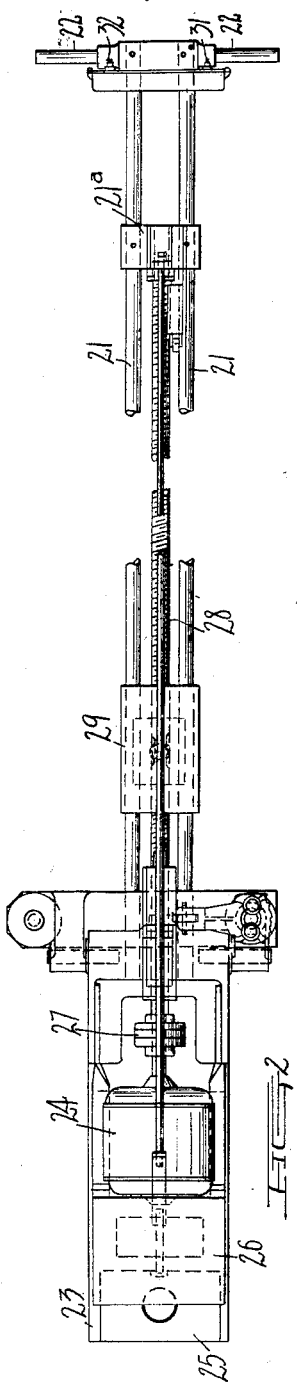
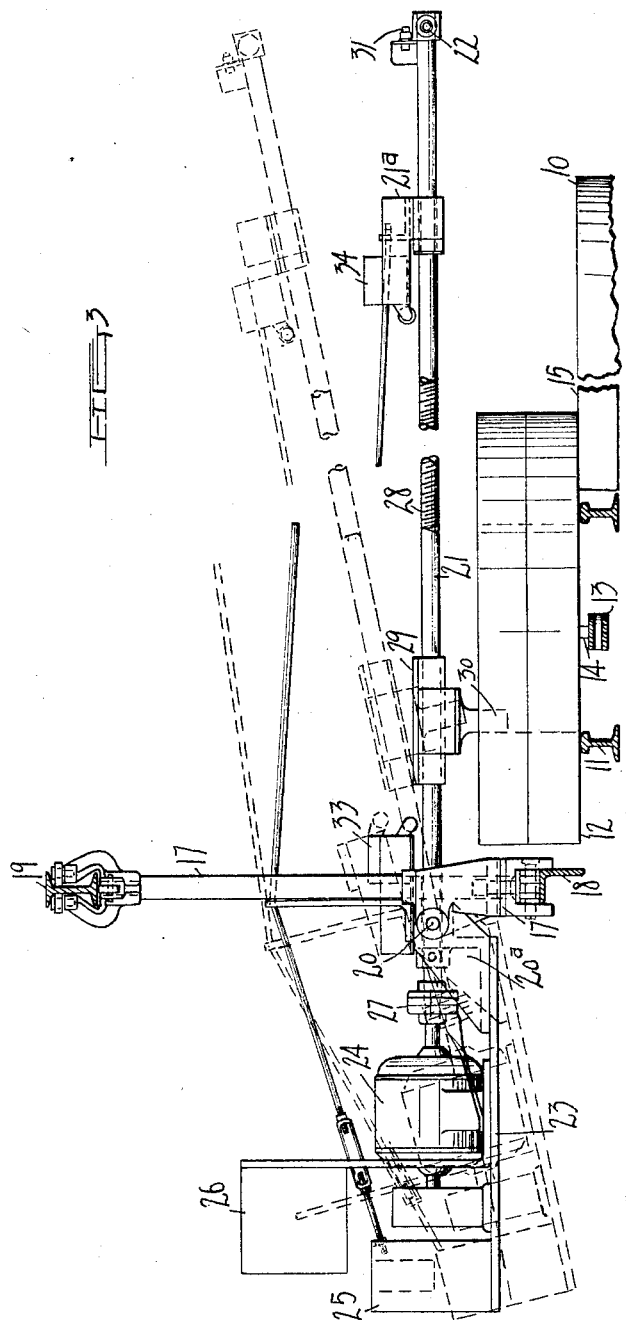
INVENTORS.
HORACE D. STEVENS
NELSON H. MYERS
BY
ATTORNEYS.

Patented May 24, 1932

1,859,849

UNITED STATES PATENT OFFICE

HORACE D. STEVENS AND NELSON H. MYERS, OF AKRON, OHIO, ASSIGNORS TO THE FIRESTONE TIRE AND RUBBER COMPANY, OF AKRON, OHIO, A CORPORATION OF OHIO

MOLD HANDLING DEVICE

Application filed August 15, 1927. Serial No. 213,164.

This invention relates to devices for handling tire molds in tire vulcanizing systems.

Heretofore, in vulcanizing tires, a series of heaters for receiving tire molds in a stack have been employed in combination with a conveyor for delivering the molds to the heaters and for removing them therefrom and upon which the molds are opened, the vulcanized tires removed, the molds cleaned, green tires inserted and the molds closed in succession between each vulcanizing operation. Certain molds are being delivered into one vulcanizer while others are being removed from another vulcanizer and while still others are in the other vulcanizers of the series undergoing the vulcanizing operation.

Two crews of men are employed, one of which fills vulcanizers, and the other of which empties vulcanizers, the crews passing from one vulcanizer to the other. Each crew has included a group of men who stand by the mold conveyor and move the molds into or out of the vulcanizers. The molds are heavy and much labor is expended in thus handling them.

It is the general object of the present invention to provide, in combination with the above described vulcanizing system, one or more, preferably two, mold pulling devices shiftable lengthwise of the conveyor opposite the vulcanizers and including means for engaging molds and either pulling them into a vulcanizer from the conveyor or pulling them out of a vulcanizer onto the conveyor whereby much labor and time are saved and the work more effectively performed.

The foregoing and other objects are obtained by the devices illustrated in the accompanying drawings and described below. It is to be understood that the invention is not limited to the specific form thereof shown and described.

Of the accompanying drawings,

Figure 1 is a plan of a vulcanizing system in which the improvements herein disclosed are installed;

Figure 2 is a plan, partly broken away, of the mold puller;

Figure 3 is a side elevation, partly broken away, thereof illustrating a mold being pulled onto the conveyor; and Figure 4 is a detail side elevation illustrating a mold being pulled into a vulcanizer.

Referring to the drawings, the numerals 10, 10 designate tire vulcanizers arranged in a row about which is installed a conveyor track 11 upon which the molds 12, 12 are slid by a conveyor chain 13 which has transversely depressible lugs 14, 14 thereon for engaging in the central openings of molds 12.

One reach of conveyor 11 is closely adjacent the row of vulcanizers 10 and from this reach there extend transverse tracks 15, 15 upon which the molds may be slid into or out of the vulcanizers 10. On the opposite reach of conveyor 11, the molds are opened, vulcanized tires removed, molds cleaned, green tires inserted and molds closed in sequence.

The foregoing constitutes a brief description of a known type of vulcanizer system to the improvement of which the present invention is directed, the improvement consisting in the provision of mechanical mold pullers for use in moving the molds into or out of the vulcanizers.

The mold pullers are indicated generally in Figure 1 by the numerals 16, 16. Referring especially to Figures 2 and 3, the mold puller 16 includes a carriage 17 adapted to roll along rails 18 and 19 arranged in vertically spaced relationship and extending lengthwise beside conveyor 11 opposite to vulcanizers 10. On carriage 17 is pivoted at 20 an arm including parallel spaced guide rods 21, 21 extending transversely over conveyor 11 and the row of vulcanizers 10, the arm having operating handles 22, 22 on its inner end.

Connected to arm 21 on the opposite or outer side of pivot 20 is a support 23 for a puller-operating motor 24 which is thus adapted to counterpoise arm 21, added weight for this purpose being indicated at 25. A motor control box 26 is also supported on plate 23. Motor 24 is connected through flexible coupling 27 to a threaded shaft 28 journaled in the hinge bracket 20ª and in a cross-piece 21ª fixed on members 21 adjacent the inner end of the arm. Shaft 28 extends through and is in threaded engagement with a cross-head 29 slidable along the arm on its members 21 and having depending therefrom a mold engaging pin 30. Manually controlled switches are arranged at 31 and 32 to operate motor 24, which is reversible, in either direction at the will of the operator and limit switches are provided at 33 and 34 normally closed, but arranged to be tripped open by cross-head 29 should the cross-head be accidently operated too far in either direction.

In use of the mold pullers 16 for filling vulcanizers 10, the carriage 17 will be rolled along rails 18 and 19 until it is opposite an empty vulcanizer 10, the ram of which is at the top of the vulcanizer. To clear the molds 12, the arm 21 is normally elevated to the dotted line position shown in Figure 3 with the cross-head 29 at its outermost position as shown.

As a mold comes opposite an empty vulcanizer, the arm 21 is lowered and the proper switch 31 or 32 is operated to slide cross-head 29 inwardly along the members 21 whereby pin 30 engages the inner periphery of the mold 12, as illustrated in Figure 4, and slides the mold over a track 15 onto the vulcanizer ram, depressing lug 14 as the mold moves transversely over the conveyor chain. The ram is then moved slowly downwardly and the proper switch 31 or 32 is operated to move cross-head 29 outwardly to the conveyor 11, the arm 21 at the same time being elevated. As the next mold moves into a position opposite the vulcanizer 10, it is similarly moved into the vulcanizer on top of the first mold which has been lowered beneath the top edge of the vulcanizer in the meantime by lowering of the ram. These operations are repeated until the vulcanizer is filled with a stack of molds, whereupon the device 16 is moved to another vulcanizer ready to be filled.

In use of the pulling device for removing molds from a vulcanizer 10, it is positioned opposite the vulcanizer, the cross-head is operated to a position over the central opening of a mold in the vulcanizer, the ram of the vulcanizer is then slowly elevated until the top mold is just above the top of the vulcanizer. Arm 21 is then depressed and cross-head 29 is operated outwardly, whereby pin 30 engages the inner periphery of the mold, as shown in Figure 3, and slides the mold outwardly over track 15 onto conveyor 11 and over one of the depressible lugs 14. The arm 21 is then elevated, the cross-head 29 again operated inwardly over the vulcanizer 10 while, in the meantime, the next lower mold in the vulcanizer has been raised by the ram to be just above the top of the vulcanizer. The removing operations are then repeated as before and so on until all the molds are removed, whereupon the device 16 may be used to fill this vulcanizer or may be moved to another ready to be emptied.

It will appear from the foregoing that an exceedingly simple device has been provided for eliminating one of the most laborious tasks in a tire factory. It will also be apparent that modifications of the invention may be resorted to without departing from the spirit thereof or the scope of the appended claims.

What is claimed is:—

1. The combination with a row of vulcanizers and a conveyor for tire molds surrounding the same and transverse tracks extending between one reach of the conveyor and the vulcanizers, of a device movable lengthwise of the conveyor opposite the row of vulcanizers for moving molds in succession from the conveyor over a transverse track into a vulcanizer or vice versa.

2. The combination with a row of vulcanizers and a conveyor having a reach extending beside the row, of a rail beside the conveyor reach, a carriage movable along the rail, a mold moving device comprising a vertically movable arm on the carriage and extending inwardly over the conveyor and vulcanizers, a cross-head movable along the arm, a mold engaging pin on the cross-head, means for moving the cross-head including a reversible motor, and means on the arm for controlling the motor to operate the cross-head in either direction along the arm.

3. The combination with a row of vulcanizers and a conveyor having a reach extending beside the row, of a rail beside the conveyor reach, a carriage movable along the rail, a mold moving device comprising a vertically movable arm pivoted on the carriage and extending inwardly over the conveyor and vulcanizers, a cross-head movable along the arm, a mold engaging pin on the cross-head, means for moving the cross-head including a reversible motor mounted on the device upon the opposite side of the pivot from the arm, and means on the arm for controlling the motor to operate the cross-head in either direction along the arm.

4. The combination with a row of vulcanizers and a conveyor having a reach extending beside the row, of a rail beside the conveyor reach, a carriage movable along the rail, a mold moving device comprising a vertically movable arm on the carriage and extending inwardly over the conveyor and vulcanizers, a cross-head movable along the arm, a mold engaging pin on the cross-head, and means for moving the cross-head including a reversible motor.

5. The combination with a row of vulcanizers and a conveyor having a reach extending beside the row, of a rail beside the conveyor reach, a carriage movable along the rail, a mold moving device comprising a vertically movable arm on the carriage and extending inwardly over the conveyor and vulcanizers, a cross-head movable along the arm, a mold engaging pin on the cross-head, and means for moving the cross-head.

6. The combination with a row of vulcanizers and a conveyor having a reach extending beside the row, of a rail beside the conveyor reach, a carriage movable along the rail, a mold moving device comprising a vertically movable arm on the carriage and extending inwardly over the conveyor and vulcanizers, a mold engaging device movable along the arm, and means for operating the mold engaging device along the arm.

HORACE D. STEVENS.
NELSON H. MYERS.